(12) United States Patent
Zheng et al.

(10) Patent No.: US 11,261,900 B2
(45) Date of Patent: Mar. 1, 2022

(54) BOLT AND METHOD FOR MANUFACTURING THE SAME

(71) Applicant: BEIJING GOLDWIND SCIENCE & CREATION WINDPOWER EQUIPMENT CO., LTD., Beijing (CN)

(72) Inventors: Guolong Zheng, Beijing (CN); Yongjun Guo, Beijing (CN); Junhao Ge, Beijing (CN); Yiping Shi, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 776 days.

(21) Appl. No.: 15/777,049

(22) PCT Filed: May 27, 2017

(86) PCT No.: PCT/CN2017/086262
§ 371 (c)(1),
(2) Date: May 17, 2018

(87) PCT Pub. No.: WO2018/120629
PCT Pub. Date: Jul. 5, 2018

(65) Prior Publication Data
US 2019/0353194 A1   Nov. 21, 2019

(30) Foreign Application Priority Data
Dec. 26, 2016   (CN) .......................... 201611218208.6

(51) Int. Cl.
*F16B 35/00*   (2006.01)
*F16B 33/02*   (2006.01)
(Continued)

(52) U.S. Cl.
CPC ............... *F16B 33/02* (2013.01); *B21H 3/02* (2013.01); *F16B 35/044* (2013.01); *F16B 39/30* (2013.01)

(58) Field of Classification Search
CPC .... F16B 33/02; F16B 2033/04; F16B 35/041; F16B 35/048
(Continued)

(56) References Cited

U.S. PATENT DOCUMENTS 4,189,975 A * 2/1980 Nisida ..................... F16B 31/06
411/423
4,326,825 A * 4/1982 Volkmann ............... F16B 4/004
411/361
(Continued)

FOREIGN PATENT DOCUMENTS

CN   201896833 U   7/2001
CN   201277240 Y   7/2009
(Continued)

OTHER PUBLICATIONS

The Extended European Search Report dated Sep. 24, 2019; Appln. No. 17870631.3.
(Continued)

*Primary Examiner* — Gary W Estremsky

(57) ABSTRACT

A bolt and a method for manufacturing the bolt are provided. The bolt includes a screw cap and a bolt bar, the bolt bar includes a positioning bar, a flexible bar and a threaded portion, the positioning bar is connected to one end of the screw cap, and the flexible bar is connected to the positioning bar and the threaded portion respectively. Wherein, an anti-shearing stand is formed on the flexible bar. The threaded portion includes standard threads and transition threads, the transition threads are formed between the flexible bar and the standard threads, and a thread height of the transition threads is smaller than a thread height of the
(Continued)

standard threads, wherein the thread height of the standard threads keeps constant. The force distribution of the threads can be optimized, and the threads can effectively cooperate with the threads of the nut.

11 Claims, 3 Drawing Sheets

(51) Int. Cl.
*B21H 3/02* (2006.01)
*F16B 35/04* (2006.01)
*F16B 39/30* (2006.01)

(58) Field of Classification Search
USPC .............................. 411/411, 378, 423, 424
See application file for complete search history.

(56) References Cited

U.S. PATENT DOCUMENTS

| 4,943,095 | A | * | 7/1990 | Sugimura | ............... | F16B 33/02 |
| | | | | | | 285/334 |
| 5,779,416 | A | * | 7/1998 | Sternitzky | ............... | F16B 33/02 |
| | | | | | | 411/411 |
| 6,503,038 | B2 | * | 1/2003 | McGough | ............... | F01L 1/46 |
| | | | | | | 285/190 |
| 9,068,558 | B2 | * | 6/2015 | Laursen | ............... | F16B 33/02 |
| 9,175,713 | B2 | * | 11/2015 | Warikoo | ............... | F16B 1/00 |
| 2002/0141816 | A1 | * | 10/2002 | Anderson | ............... | F16B 33/02 |
| | | | | | | 403/299 |
| 2002/0141846 | A1 | * | 10/2002 | McGough | ............... | F02F 1/24 |
| | | | | | | 411/378 |
| 2004/0265090 | A1 | | 12/2004 | Stone | | |
| 2007/0280803 | A1 | | 12/2007 | Pritchard | | |
| 2009/0067947 | A1 | * | 3/2009 | Ichiryu | ............... | F16B 35/06 |
| | | | | | | 411/427 |
| 2011/0158767 | A1 | * | 6/2011 | Elkins | ............... | B21H 7/002 |
| | | | | | | 411/424 |
| 2012/0171038 | A1 | | 7/2012 | Laursen | | |
| 2013/0259599 | A1 | * | 10/2013 | Benjamin | ............... | F01D 5/06 |
| | | | | | | 411/366.1 |
| 2016/0169263 | A1 | | 6/2016 | Mori et al. | | |
| 2020/0300286 | A1 | * | 9/2020 | Zhang | ............... | F03D 1/0675 |

FOREIGN PATENT DOCUMENTS

| CN | 101576112 A | 11/2009 |
| CN | 201437812 U | 4/2010 |
| CN | 201606376 A | 10/2010 |
| CN | 102094881 A | 6/2011 |
| CN | 102588410 A | 7/2012 |
| CN | 104033464 A | 9/2014 |
| CN | 204186741 U | 3/2015 |
| CN | 104595328 A | 5/2015 |
| CN | 205615379 U | 10/2016 |
| JP | 2007-518937 A | 7/2007 |
| JP | 2009-174564 A | 8/2009 |
| NL | 1011531 C2 | 9/2000 |

OTHER PUBLICATIONS

English Translation of the Summary of the First Chinese Office Action dated Apr. 25, 2018; Appln. No. 201611218208.6.
International Search Report dated Sep. 29, 2017; PCT/CN2017/086262.

* cited by examiner

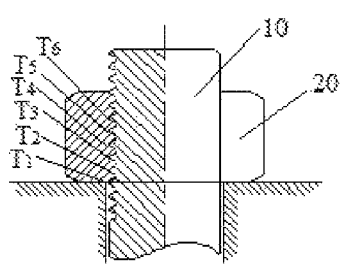
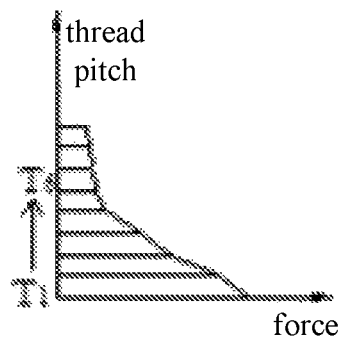
Figure 1A
Figure 1B
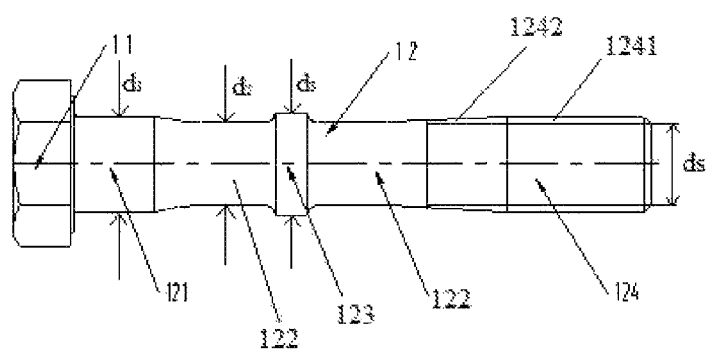
Figure 2

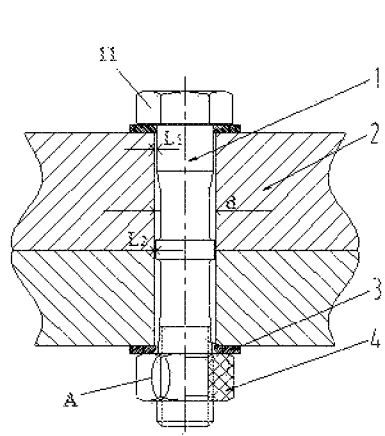
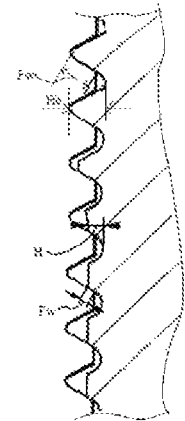
Figure 3A                    Figure 3B
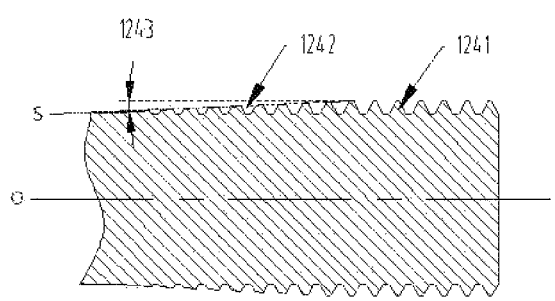
Figure 4

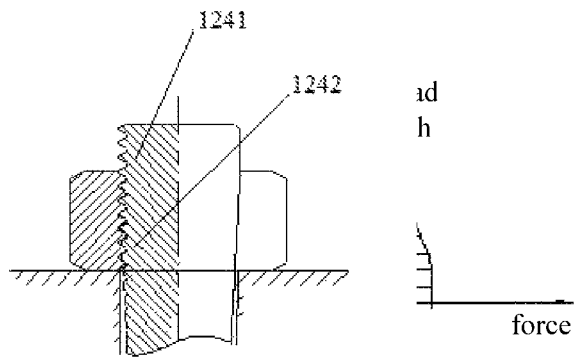
Figure 5A
Figure 5B
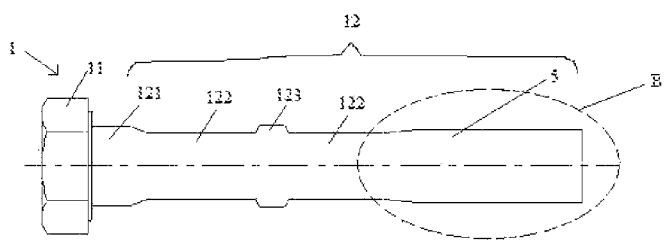
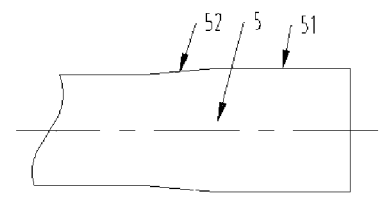
Figure 6A
Figure 6B
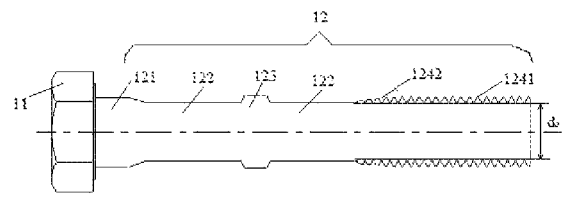
Figure 6C

BOLT AND METHOD FOR MANUFACTURING THE SAME

The present application is the national phase of International Application No. PCT/CN2017/086262, titled "BOLT AND METHOD FOR MANUFACTURING THE SAME", filed on May 27, 2017 which claims the benefit of priority to Chinese patent application No. 201611218208.6 titled "BOLT AND METHOD FOR MANUFACTURING THE SAME", filed with the Chinese State Intellectual Property Office on Dec. 26, 2016, the entire disclosures of which applications are incorporated herein by reference

FIELD

The present application relates to a bolt and a method for manufacturing the bolt, and specifically relates to a bolt and a method for manufacturing the bolt, of which the force distribution of threads can be optimized, the shearing resistance can be improved and the service life can be prolonged.

BACKGROUND

With the rapid development of the modem industrial technology, higher and higher requirements are imposed on industrial equipments. More and more industrial equipments are required to be used under harsh conditions such as high speed and high pressure. In such a working environment, some key power equipments such as turbine rotor and blades of an engine and suspension parts of a rolling stock often encounter fatigue failure problems.

Among the forms of industrial equipment connections, fasteners are one of the basic components of large quantity and wide application range. The fasteners are indispensable weight parts and connectors for various industries, and are widely used in various mechanical devices. One of the most important functions of the fasteners is to transfer load, however, fasteners failure and fracture often happen due to various reasons, resulting in serious accidents of large equipments and causing property and personnel losses. Especially for the bolts used as connectors, fatigue fracture is extremely apt to happen under the action of a changing dynamic load, resulting in a connection failure.

FIG. 1A is a schematic view showing a standard bolt and a standard nut in the conventional technology engaged with each other, and FIG. 1B is a view showing a force distribution of each thread in a state that the standard bolt and the standard nut in the conventional technology are engaged with each other.

When the bolt and the nut 20 in the conventional technology are used to connect other equipments, an engagement form of a bolt bar 10 of the bolt and threads of the nut 20 is shown in FIG. 1A. In a working state, the bolt bar 10 generates a tensile deformation, and a compressive deformation is generated at the threads, resulting in an uneven load distribution on all threads of the bolt bar. The stresses on the roots of a first few threads (for example, a first thread T1, a second thread T2, a third thread T3, a fourth thread T4 and the like), via which the nut 20 is engaged with the bolt bar 10, are much larger than the stresses on last threads, as shown in FIG. 1B. Specifically, a tensile force on the first thread T1 is approximately 35% of the total tensile force, the tensile force on the second thread T2 is approximately 25% of the total tensile force, and the tensile force on the third thread T3 is approximately 15% of the total tensile force, that is, the tensile force on the first three threads (T1, T2 and T) is 75% of the total tensile force, and the tensile force gets smaller and relatively even from the sixth thread T6. Statistics further show that, approximately 65% of all the broken bolts generates fatigue fracture at the first and the second threads T1 and T2 counted from a support surface of the nut.

In the conventional technology, many solutions have been provided to improve the anti-fatigue performance of the bolt connection. For example, a solution of employing high-strength materials to manufacture a flexible bolt, a solution of combining a flexible bolt and an elastic device to form a bolt connection device, or a solution of combining a screw cap and a thread body to form a bolt with a controllable force moment. However, the solutions generally cannot meet the anti-fatigue performance, tensile strength and fatigue service life required by the connected devices subjected to frequently fluctuating loads.

SUMMARY

The content of the present application is provided to introduce the options of the inventive concept, which is further described hereinafter in a simplified form in specific embodiments. The content of the present application is not intended to determine the key characteristics or essential features of the subjects to be protected, nor is it intended to help determining the scope of the subjects to be protected.

In a general aspect, a bolt is provided according to the present application, the bolt includes a screw cap and a bolt bar. The bolt bar includes a positioning bar, a flexible bar and a threaded portion, the positioning bar is connected to one end of the screw cap, and the flexible bar is connected to the positioning bar and the threaded portion. An anti-shearing stand is formed on the flexible bar. The threaded portion includes a standard thread and a transition thread, the transition thread is formed between the flexible bar and the standard thread, and a thread height of the transition threads is smaller than the thread height of the standard threads, and the thread height ($H_0$) of the standard threads (1241) keeps constant.

Each of the transition threads is formed in a manner that a thread crest is partially truncated.

The thread height of the transition threads gradually increases toward the standard threads.

A thread crest line of the transition threads is of an oblique line shape or a curve shape.

The thread crest line forms a tapered angle with respect to an axis of the bolt, and a range of the tapered angle may be 1 degree to 10 degrees.

A range of the tapered angle may be from 3 to 5 degrees.

The transition threads include 4 to 5 threads.

A diameter of the flexible bar may be smaller than a diameter of the positioning bar, and a diameter of the anti-shearing stand may be equal to a diameter of the positioning bar.

The diameter of the flexible bar may be 0.85 times a nominal diameter of the bolt.

In an axial direction of the bolt, a length of the positioning bar may be 20 mm, and a length of the anti-shearing stand may be 8 mm to 10 mm.

The anti-shearing stand (123) is arranged such that when the bolt (1) connects two or more connected pieces (2), the anti-shearing stand (123) is located at a joint surface where the connected pieces (2) are jointed.

In another general aspect, a method for manufacturing the bolt according to the present application includes: forming blanks corresponding to the positioning bar, the flexible bar, the anti-shearing stand on the flexible bar and the threaded portion; forming the nut; forming the standard threads and the transition threads on the blanks by thread rolling technology, wherein in the thread rolling technology, both the standard threads and the transition threads are formed one time by taking a thread root diameter of the threaded portion as a baseline.

The blanks may include a cylindrical blank and a blank of a revolving body shape with a varying diameter.

The bolt according to the present application can optimize the force distribution of the threads (especially the force distribution of the first three threads), and can effectively cooperate with the threads of the nut. Moreover the manufacturing process is simple and the cost is low.

BRIEF DESCRIPTION OF THE DRAWINGS

These and/or other aspects of the present application will become apparent and easy to understand from the detailed description of embodiments in conjunction with the drawings. In the drawings:

FIG. 1A is a schematic view showing the thread engagement of a standard bolt and a standard nut according to the conventional technology engaged with each other;

FIG. 1B is a view showing a force distribution of all threads when the standard bolt and the standard nut according to the conventional technology are engaged with each other;

FIG. 2 is a schematic view showing the structure of a bolt according to an embodiment of the present application;

FIG. 3A is a schematic view showing the bolt according to the embodiment of the present application in a used state for fastening;

FIG. 3B is a partially enlarged view showing portion "A" in FIG. 3A;

FIG. 4 is a sectional view showing a threaded portion according to the embodiment of the present application;

FIG. 5A is a schematic view showing the threaded portion according to the embodiment of the present application engaged with a standard nut;

FIG. 5B is a view showing a force distribution of all threads when the threaded portion according to the embodiment of the present application is engaged with the standard nut;

FIG. 6A is a schematic view showing a bolt structure in the process of manufacturing the bolt according to the present application;

FIG. 6B is a partially enlarged view showing portion "B" in FIG. 6A;

FIG. 6C is a schematic view showing the bolt manufactured by a method according to the present application.

In all the drawings and embodiments, the same reference numeral refers to the same component. The drawings may not be drawn in scale. For clear description and simplicity, the relative size, scale and depiction of parts in the drawings can be magnified.

DETAILED DESCRIPTION

Embodiments of the present application are described in detail herein. The same reference numerals always refer to the same components. The embodiments of the present application are provided to describe the present application, rather than limit the present application. Actually, it should be understood by those skilled in the field that, various modifications and variations can be made in the present application without departing from the scope or the spirit of the present application. For example, the features shown or described as part of one embodiment can be used in another embodiment to generate another embodiment. Therefore, the modifications and variations falling within the scope defined by the claims and the equivalents thereof are intended to be included in the present application.

FIG. 2 is a schematic view showing the structure of a bolt 1 according to an embodiment of the present application; FIG. 3A is a schematic view showing the bolt according to the embodiment of the present application in a used state for fastening; FIG. 3B is a partially enlarged view showing portion "A" in FIG. 3A; FIG. 4 is a sectional view showing a threaded portion according to the embodiment of the present application; FIG. 5A is a schematic view showing the threaded portion according to the embodiment of the present application engaged with a standard nut; FIG. 5B is a view showing a force distribution of all threads when the threaded portion according to the embodiment of the present application is engaged with the standard nut. The structure of the bolt 1 according to the present application will be described in detail hereinafter with reference to FIG. 1 to FIG. 5B.

As shown in FIG. 2, the bolt 1 according to the embodiment of the present application includes a screw cap 11 and a bolt bar 12. The bolt bar 12 includes a positioning bar 121, a flexible bar 122 and a threaded portion 124. The positioning bar 121 is connected to one end of the screw cap 11, and the flexible bar 122 is connected to the positioning bar 121 and the threaded portion 124 respectively. In addition, an anti-shearing stand 123 is formed on the flexible bar 122, the threaded portion 124 includes transition threads 1242 and standard threads 1241, and the transition threads 1242 are arranged adjacent to the flexible bar 122.

The shape and structure of each part of the bolt bar 12 will be described in detail hereinafter.

A diameter $d_1$ of the positioning bar 121 is approximately equal to a diameter d of a bolt hole (a hole in a connected piece 2 used for employing a bolt to connect), as shown in FIG. 3A. Preferably, the diameter $d_1$ of the positioning bar 121 is approximately 0.95 times the diameter d of the bolt hole, or, an interval $L_1$ between the positioning bar 121 and the bolt hole is smaller than 0.5 mm (for bolts above M16), and more preferably smaller than 0.25 mm (for bolts equal to or under M16), so that the positioning bar 121 plays a better positioning function to a whole connection structure of the bolt and nut.

A diameter $d_2$ of the flexible bar 122 is smaller than the diameter d1 of the positioning bar 121, this is because that under the same stress, the smaller the diameter of the bolt bar, the smaller the stress subjected by the whole connection structure, and the better the anti-fatigue strength performance. However, though the smaller the diameter d2 of the flexible bar 122, the better the anti-fatigue strength performance of the bolt 1, in case that the diameter d2 of the flexible bar 122 is smaller than a minimum diameter of a standard thread (approximately 0.85 times the nominal diameter do (not shown) of the bolt), the rigidity of the flexible bar 122 is too low, which may decrease the value of a maximum tensile force that the whole connection structure can withstand, and accordingly the fastening performance of the bolt 1 is degraded. Therefore, in order to reduce the load factor to make the bolt 1 more uniformly stressed without reducing the maximum tensile force that the bolt 1 can withstand, the diameter $d_2$ of the flexible bar 122 may be approximately 0.85 times the nominal diameter do of the bolt (that is, $d_2 0.85 d_0$).

In addition, since the connected pieces 2 fastened by the bolt 1 may slide transversely when subjected to an extreme force caused by an irresistible force, the bolt bar 12 is subjected to a large shearing force at a joint surface of the connected pieces 2. In case that the bolt 1 cannot withstand the shearing three, the bolt connection structure may be damaged, resulting in a failure of the connected pieces 2. In order to avoid such a situation, a diameter of the bolt bar 12 at the joint surface should be as large as possible, so as to improve the anti-shearing capacity. Therefore, in order to improve the anti-shearing capacity while ensuring the anti-fatigue strength performance, the anti-shearing stand 123 may be formed on the bolt bar 12 according to the embodiment of the present application. Moreover, since the joint surface generally corresponds to an intermediate position of the flexible bar 122, the anti-shearing stand 123 having a predetermined length is arranged at a position (generally the intermediate position of the flexible bar 122) corresponding to the joint surface of the flexible bar 122, as shown in FIG. 2 and FIG. 3.

Since the larger the diameter of the anti-shearing stand 123, the better the anti-shearing capacity and the anti-tension capacity, the diameter d3 of the anti-shearing stand 123 is approximately equal to the diameter d of the bolt. Specifically, the diameter d3 of the anti-shearing stand 123 may be arranged to be 0.95 times the diameter d of the bolt, or, an interval L2 between the anti-shearing stand 123 and the bolt hole is smaller than 0.5 mm (for bolts above M16), and more preferably smaller than 0.25 mm (for bolts equal to or under M16). The anti-shearing capacity of the bolt equals to an anti-shearing area of the bolt multiplied by the anti-shearing strength of the bolt, therefore, a length of the anti-shearing stand 123 is set between 8 to 10 mm on the premise that a relatively good anti-fatigue performance of the bolt 1 is ensured. In this way, by the arrangement of the flexible bar 122 and the anti-shearing stand 123 formed on the flexible bar 122, the anti-fatigue performance, anti-shearing capacity and anti-tension capacity of the bolt 1 according to the present application can be improved.

In addition, in order to prevent the bolt bar 12 from generating a stress concentration phenomenon when subjected to an external stress, a smooth transition can be realized by adopting a rounded corner such as the rounded corner of R25 between the positioning bar 121 and the flexible bar 122, and the smooth transition can be realized by adopting a rounded corner of R10, R20 or R40 for example, between the anti-shearing stand and the flexible bar 122.

In order to ensure the effective engaging length required by the threads during engagement, and make all the threads be subjected to uniform force to reduce the occurrence of the phenomena in the conventional technology that the fatigue fracture is apt to happen due to the first few threads (especially the first thread) being subjected to a too large tensile force, the threaded portion 124 according to the embodiment of the present application includes standard threads 1241 and transition threads 1242 (specifically see FIG. 4), and the transition thread can be formed in a manner that a thread crest is partially truncated, as shown in FIG. 3B. Specifically, the standard threads 1241 have the same thread root diameter (ds) as the transition thread 1242 (as shown in FIG. 2), and a height H of the transition threads 1242 is smaller than a thread height $H_0$ of the standard threads 1241, as shown in FIG. 3B. The thread height ($H_0$) of the standard threads (1241) keeps constant, that is, each of the threads of the standard threads has the same height.

The transition threads 1242 are preferably the first 4 to 5 threads (that is, the 4 to 5 threads which are closer to the screw cap) of the threaded portion 124, and have a thread height H with an inclination angle which is gradually increased toward the standard threads 1241. Under such a situation, a thread crest line S of the transition threads 1242 may be an oblique line shape or a curve shape with respect to an axis O of the bolt 1. For example, the thread crest line S may have the shape of quadratic log function curve, parabolic curve, or binomial curve and the like. Here, the thread crest line S refers to a virtual side S formed by connecting crests of all threads in a cross section of the transition threads 1242 (i.e., the section shown in FIG. 4). The thread crest line S forms a tapered angle 1243 with respect to the axis O of the bolt 1, in case that the thread crest line S is a curve, the tapered angle 1243 refers to an included angle between a straight line formed by connecting two endpoints of the thread crest line S and the axis O. The size of the tapered angle 1243 can be increased as the increase of the tensile three of the bolt 1, so that the force of the bolt can be distributed better, and the tapered angle 1243 may be designed to be within a range from 1 degree to 10 degrees as needed. Preferably, the tapered angle 1243 is designed to be 3 to 5 degrees. For example, in the case that a pre-tightening force of the bolt is 75% of the yield axial force, the tapered angle 1243 is optimally 3 degrees.

In addition, the length of the threaded portion 124 is preferably 2 to 3 times (i.e., $2d_0$ to $3d_0$) the nominal diameter of the bolt. In this case, first, when the threaded portion 124 according to the present application engaged with a nut 4 having the standard threads is subjected to a force, since the thread height H of the transition threads 1242 is smaller than the thread height of the standard threads 1241, a contact area Fw of the transition threads 1242 is smaller than a contact area $Fw_0$ of the standard threads 1241, as shown in FIG. 3B. Therefore, when the threaded portion 124 according to the present application engaged with a nut 4 having the standard threads is subjected to a force, a tensile force subjected by the transition threads 1242 can be reduced, and when the threaded portion 124 is subjected to the tensile force, the tensile force originally subjected by the first few threads of the threaded portion 124 may be partially transferred to the last several threads, so that the force of the entire threaded portion 124 becomes uniform, as shown in FIGS. 5A and 5B, and meanwhile the factor of the stress concentration is minimized. Therefore, the threaded portion 124 according to the present application can effectively prevent phenomenon of the fatigue fracture from happening due to the first three threads (especially the first thread) being subjected to a too large tensile force, so as to enhance the service life of the bolt effectively.

In addition, the threaded portion 124 according to the present application not only can cooperate with the threads of the nut effectively, but also can cooperate with the threads in a blind hole of a base body effectively.

When used as fasteners, the bolt 1 according to the present application and the standard nut 4 form a combination structure with the connected pieces 2, as shown in FIG. 3A. A gasket 3 is arranged between the screw cap 11 and the connected pieces 2, and between the nut 4 and the connected pieces 2 respectively, so as to protect a surface of each connected piece 2 from being damaged by the nut, and disperse the pressure of the standard nut 4 against the connected piece 2.

FIG. 6A is a schematic view showing a bolt structure in the manufacturing process of the bolt 1 according to the present application, FIG. 6B is a partially enlarged view showing portion "B" in FIG. 6A, and FIG. 6C is a schematic view showing the bolt manufactured by a method according to the present application. A method for manufacturing the bolt 1 according to the present application is described in detail hereinafter with reference to FIG. 6A to FIG. 6C.

When manufacturing the bolt 1 according to the present application, first, the positioning bar 121, the flexible bar 122 and the anti-shearing stand 123 are manufactured by the turning technology according to the length and shape of each part of the bolt bar 12, and a blank 5 of the threaded portion 124 is manufactured, as shown in FIG. 6A. In addition, a screw cap portion used for forming the screw cap 11 can also be manufactured by the turning technology. Referring to FIG. 6B, the blank 5 of the threaded portion 124 includes a blank 51 of the standard thread 1241 and a blank 52 of the transition thread 1242. Specifically, a shape of the blank 52 can be manufactured according to the shape of the transition thread 1242 to be formed. Therefore, the blank 52 is of a revolving body shape with a varying diameter. Specifically, the shape of the blank 52 is consistent with the shape of the thread crest line S to be formed.

Then, the screw cap (such as a hexagon head) 11 is formed by the screw cap portion through the forging technology, as shown in FIG. 6A. Since the positioning bar 121 is required to have a relatively large bending moment resistance capacity during the forging technology, the length of the positioning bar 121 should be at least 20 mm, and preferably be 20 mm according to the present application.

Next, the blank 5 after heat treatment is performed with a thread rolling technology taking a thread root diameter ds of the threaded portion 124 as a baseline by adopting the thread rolling technology, thus forming the threaded portion 124 according to the embodiment of the present application, as shown in FIG. 6C. In addition, in the present application, the threaded portion 124 according to the present application can be completed one time only by using a cylindrical die roll for forming the standard threads 1241, and no process is required to be performed to the threaded portion 124 any more after the thread rolling technology, therefore the manufactured bolt 1 can keep a smooth metal streamline. Thus the manufacturing process according to the present application is simple and has a low cost.

As mentioned above, compared with the bolt manufacturing process in the conventional technology, the bolt manufacturing method according to the present application addresses the issues of difficulties in machining the tapered threads, and can ensure the smooth metal streamline and the surface compressive stress state without increasing working procedures, and can also reduce the manufacturing cost.

As mentioned above, the threaded portion 124 according to the present application can make the force distribution of each of the threads be more uniform, which effectively prevents the phenomenon of the fatigue fracture due to the first three threads (especially the first thread) being subjected to a too large tensile force from happening during the thread engagement, enhances the service reliability of the bolt and reduces the machining difficulty and machining cost of the transition threads.

Though a few embodiments have been shown and described, it should be understood by those skilled in the art that, variations can be made to these embodiments without departing from the principles and spirits of the of the present application defined by the claims and the equivalents thereof.

What is claimed is:

1. A bolt, comprising:
a screw cap and a bolt bar, wherein the bolt bar comprises a positioning bar, a flexible bar and a threaded portion, the positioning bar is directly connected to one end of the screw cap, and the flexible bar is connected to the positioning bar and the threaded portion respectively;
an anti-shearing stand is formed on the flexible bar; and the threaded portion comprises standard threads and transition threads, the transition threads are formed between the flexible bar and the standard threads, and a thread height of the transition threads is smaller than a thread height of the standard threads, wherein the thread height of the standard threads keeps constant; wherein
a diameter of the flexible bar is smaller than a diameter of the positioning bar; and
a diameter of the anti-shearing stand is equal to the diameter of the positioning bar; and wherein
the diameter of the flexible bar is 0.85 times a nominal diameter of the bolt; and in an axial direction of the bolt, a length of the positioning bar is 20 mm, and a length of the anti-shearing stand is 8 mm to 10 mm.

2. The bolt according to claim 1, wherein each of the transition thread is formed in a manner that a thread crest is partially truncated.

3. The bolt according to claim 2, wherein the thread height of the transition threads gradually increases toward the standard threads.

4. The bolt according to claim 3, wherein a thread crest line of the transition threads is of an oblique line shape or a curve shape.

5. The bolt according to claim 4, wherein,
the thread crest line forms a tapered angle with respect to an axis of the bolt; and
wherein a range of the tapered angle is from 1 degree to 10 degrees.

6. The bolt according to claim 5, wherein the range of the tapered angle is 3 to 5 degrees.

7. The bolt according to claim 1, wherein the transition threads comprise 4 to 5 threads which are close to the screw cap.

8. The bolt according to claim 2, wherein the transition threads comprise 4 to 5 threads which are close to the screw cap.

9. The bolt according to claim 1, wherein the anti-shearing stand is arranged such that when two or more connected pieces are connected by the bolt, the anti-shearing stand is located at a joint surface where the connected pieces are jointed.

10. A method for manufacturing the bolt according to claim 1, comprising:
forming the positioning bar, the flexible bar having the anti-shearing stand, and a blank corresponding to the threaded portion of the bolt bar of the bolt;
forming the screw cap of the bolt;
forming the standard threads and the transition threads on the blank by thread rolling technology, wherein in the thread rolling technology, both the standard threads and the transition threads are formed one time by taking a thread root diameter of the threaded portion as a baseline;
and wherein
the positioning bar is directly connected to one end of the screw cap, and the flexible bar is connected to the positioning bar and the threaded portion respectively;
the diameter of the flexible bar is smaller than the diameter of the positioning bar, and the diameter of the anti-shearing stand is equal to the diameter of the positioning bar;
the diameter of the flexible bar is 0.85 times a nominal diameter of the bolt; and in the axial direction of the bolt, the length of the positioning bar is 20 mm, and the length of the anti-shearing stand is 8 mm to 10 mm.

11. The method according to claim 10, wherein the blank comprises a cylindrical blank and a blank of a revolving body shape with a varying diameter.

* * * * *